US007411985B2

(12) United States Patent
Lee et al.

(10) Patent No.: US 7,411,985 B2
(45) Date of Patent: Aug. 12, 2008

(54) LOW-COMPLEXITY PACKET LOSS CONCEALMENT METHOD FOR VOICE-OVER-IP SPEECH TRANSMISSION

(75) Inventors: Minkyu Lee, Ringoes, NJ (US); James William McGowan, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1213 days.

(21) Appl. No.: 10/394,118

(22) Filed: Mar. 21, 2003

(65) Prior Publication Data

US 2004/0184443 A1 Sep. 23, 2004

(51) Int. Cl.
*H04L 12/26* (2006.01)

(52) U.S. Cl. ........................ 370/912; 370/465; 370/352; 370/230; 704/207; 704/218; 704/214

(58) Field of Classification Search ................ 704/208, 704/207, 214, 201, 218; 370/352, 465, 912
See application file for complete search history.

(56) References Cited

U.S. PATENT DOCUMENTS

| | | | | |
|---|---|---|---|---|
| 5,550,543 | A | 8/1996 | Chen et al. | 341/94 |
| 5,615,298 | A | 3/1997 | Chen | 395/2.37 |
| 6,810,377 | B1 * | 10/2004 | Ho et al. | 704/208 |

OTHER PUBLICATIONS

U.S. Appl. No. 09/347,462, filed Jul. 6, 1999, McGowan, "Lost-Packet Replacement For A Digital Voice Signal".

U.S. Appl. No. 09/526,690, filed Mar. 15, 2000, McGowan, "Lost-Packet Replacement For Voice Applications Over Packet Network".

U.S. Appl. No. 09/773,799, filed Feb. 1, 2001, McGowan, "The Burst Ratio: A Measure Of Bursty Loss On Packet Based Networks".

U.S. Appl. No. 10/322,331, filed Dec. 18, 2002, McGowan, "Method And Apparatus For Providing Coder Independent Packet Replacement".

ITU-T Recommendation G.711 (1988), "Pulse code modulation (PCM) of voice frequencies."

ITU-T Recommendation G.711 Appendix II (2000), A high quality low-complexity algorithm for packet loss concealment with G.711.

ITU-T Recommendation G.711 Appendix I (1999), "A comfort noise payload definition for ITU-T G.711 use in packet-based multimedia communication systems."

ITU-T Recommendation p.800 (1996), "Methods for subjective determination of transmission quality."

* cited by examiner

*Primary Examiner*—Ahmad F. Matar
*Assistant Examiner*—Karen Le
(74) *Attorney, Agent, or Firm*—Kenneth M. Brown

(57) ABSTRACT

A low complexity packet loss concealment method for use in voice-over-IP speech transmission calculates a cross-correlation of previous speech data to estimate the pitch period of the previous speech when speech frames have been lost. A tap interval used to calculate the cross-correlation is dynamically adapted, thereby reducing the computational complexity of the process. In addition, the pitch period estimation is bypassed completely when it is determined not to be necessary, as a result of the speech being unvoiced or silence. A waveform "bending" operation is performed into the current frame without inserting any algorithmic delay into each frame.

24 Claims, 4 Drawing Sheets

LOW-COMPLEXITY PACKET LOSS CONCEALMENT METHOD FOR VOICE-OVER-IP SPEECH TRANSMISSION

FIELD OF THE INVENTION

The present invention relates generally to the field of packet-based communication systems for speech transmission, and more particularly to a low complexity packet loss concealment method for use in voice-over-IP (Internet Protocol) speech transmission methods, such as, for example, the G.711 standard communications protocol as recommended by the ITU-T (International Telecommunications Union Telecommunications Standardization Sector).

BACKGROUND OF THE INVENTION

ITU-T recommendation G.711 describes pulse code modulation (PCM) of 8000 Hz sampled voice (i.e., speech). In order to handle the packet loss inherent in the design of a voice-over-IP network, ITU-T adopted G.711 Appendix I (also known as "G.711 PLC"), which standardizes a high quality low-complexity algorithm for packet loss concealment with G.711. The G.711 PLC algorithm can be summarized as follows:

(a) During good frames (i.e., those properly received), a copy of the decoded output is saved in a circular buffer (known as a "pitch buffer") and the output is delayed by 3.75 ms (i.e., 30 samples) before being sent to a playout buffer. Each frame is assumed to be 10 ms (i.e., 80 samples).

(b) If a frame is lost, the pitch period of the speech in the previous good frame is estimated based on a calculated normalized cross-correlation of the most recent 20 ms of speech in the pitch buffer. The pitch search range is between 220 Hz and 66 Hz.

(c) For the first 10 ms of erasure, the pitch period is repeated using a triangular overlap-add window at the boundary between the previously received material and the generated replacement material. For the next 10 ms of erasure, the last two pitch periods in the pitch buffer are alternately repeated, and at 20 ms of erasure, a third pitch period is added. This portion of the algorithm is used to minimize distortions due to packet boundaries which produce clicking noises, and to disrupt the correlation between frames, which produces an echo-like or robotic sound.

(d) For long erasures, the amplitude is attenuated at the rate of 20% per 10 ms. After 60 ms, the synthesized signal is zero (which may optionally be later replaced by a comfort noise as specified by ITU-T G.711 Appendix II).

The algorithmic complexity of G.711 PLC is approximately 0.5 of a DSP (Digital Signal Processor) MIPS (million instructions per second), or 500,000 instructions per second per channel. Although G.711 PLC is considered a "low complexity" approach to the packet loss concealment problem, its complexity level may nonetheless be prohibitive in terminals where very few MIPS are available, and expensive in larger switches that must, for example, dedicate a 100 MHz DSP chip for every 200 channels of capacity for concealment alone.

By contrast, an alternative "packet repetition" approach (familiar to those skilled in the art) in which previously received packets are simply repeated to fill the gap left by lost packets, is not nearly as complex, requiring only several hundred instructions (i.e., <0.001 MIPS). However, the resultant voice quality of the "packet repetition" approach is generally not equal to that of G.711 PLC.

SUMMARY OF THE INVENTION

We have recognized that more than 90% of the algorithmic complexity of the G.711 PLC algorithm resides in the calculation of the normalized cross-correlation in the pitch detection routine as described in step (b) above. Therefore, by reducing the amount of computation used in executing that particular step, the present invention advantageously provides an improved (i.e., more efficient) method of packet loss concealment for use with voice-over-IP speech transmission methods, such as, for example, the ITU-T G.711 standard communications protocol. In particular, and in accordance with an illustrative embodiment of the invention, complexity is reduced as compared to prior art packet loss concealment methods typically used in such environments, without a significant loss in voice quality. Moreover, the illustrative embodiment of the present invention eliminates the algorithmic delay often associated with such typically used methods.

More particularly, the illustrative embodiment of the present invention dynamically adapts the tap interval used in calculating the normalized cross-correlation of previous speech data when speech frames have been lost, thereby reducing the computational complexity of the packet loss concealment process. (This normalized cross-correlation of the previous speech data is advantageously calculated in order to estimate the pitch period of the previous speech.) In addition, the illustrative embodiment of the present invention advantageously bypasses the pitch estimation completely when it is determined not to be necessary. Specifically, such pitch estimation is unnecessary when the speech is unvoiced or silence. And finally, in accordance with the illustrative embodiment of the present invention, a waveform "bending" operation is performed into the current frame without inserting an algorithmic delay into each frame (as does the typically employed prior art methods).

Although the illustrative embodiment of the present invention described herein incorporates all of the novel techniques described in the previous paragraph, each of these techniques may be employed individually or in combination in accordance with other illustrative embodiments of the invention.

BRIEF DESCRIPTION OF THE DRAWINGS

FIG. 3 shows the steps of a waveform "bending" operation being performed into the current frame without inserting delay in accordance with the illustrative embodiment of the present invention.

DETAILED DESCRIPTION

Tap Interval Adaptation in Accordance with the Illustrative Embodiment

In accordance with the illustrative embodiment of the present invention, we first advantageously exploit the fact that the normalized cross-correlation of a speech signal varies smoothly when the speech signal represents voiced speech. Note that the G.711 PLC algorithm initially calculates the normalized cross-correlation at every other sample (a 2:1 decimation) for a "coarse" search. Then, each sample is examined only near the observed maximum. The use of this initial coarse search (with decimation) reduces the overall complexity of the G.711 PLC algorithm.

In accordance with the illustrative embodiment of the present invention, we first calculate the normalized cross-correlation of, for example, the most recent 20 msec (i.e., 160 samples) in the pitch buffer with the previous speech at, for example, 5 msec taps (i.e., 40 samples). Only every other sample in the 20 msec window is advantageously used for the calculation of the normalized cross-correlation. Next, starting with an initial tap interval of, say, two samples (as in G.711 PLC), another normalized cross-correlation is advantageously calculated at the next tap at 5.25 msec (i.e., at the 42' nd sample, thereby skipping one sample).

Then, however, in accordance with the principles of the present invention, if the correlation is determined to be decreasing, the tap interval is advantageously increased (for example, by one) so that the subsequent normalized cross-correlations are calculated at the taps at 5.625 msec (i.e., at the 45' th sample, thereby skipping two samples), at 6.125 msec (i.e., at the 49' th sample, thereby skipping three samples), etc. This tap interval is advantageously incremented (as long as the correlation continues to decrease) up to a maximum value of, for example, five samples. Finally, when the correlation begins to increase, the tap interval may then be gradually decreased (e.g., decremented by one at each subsequent calculation) back to the initial tap interval of two (for example).

Figure 1:
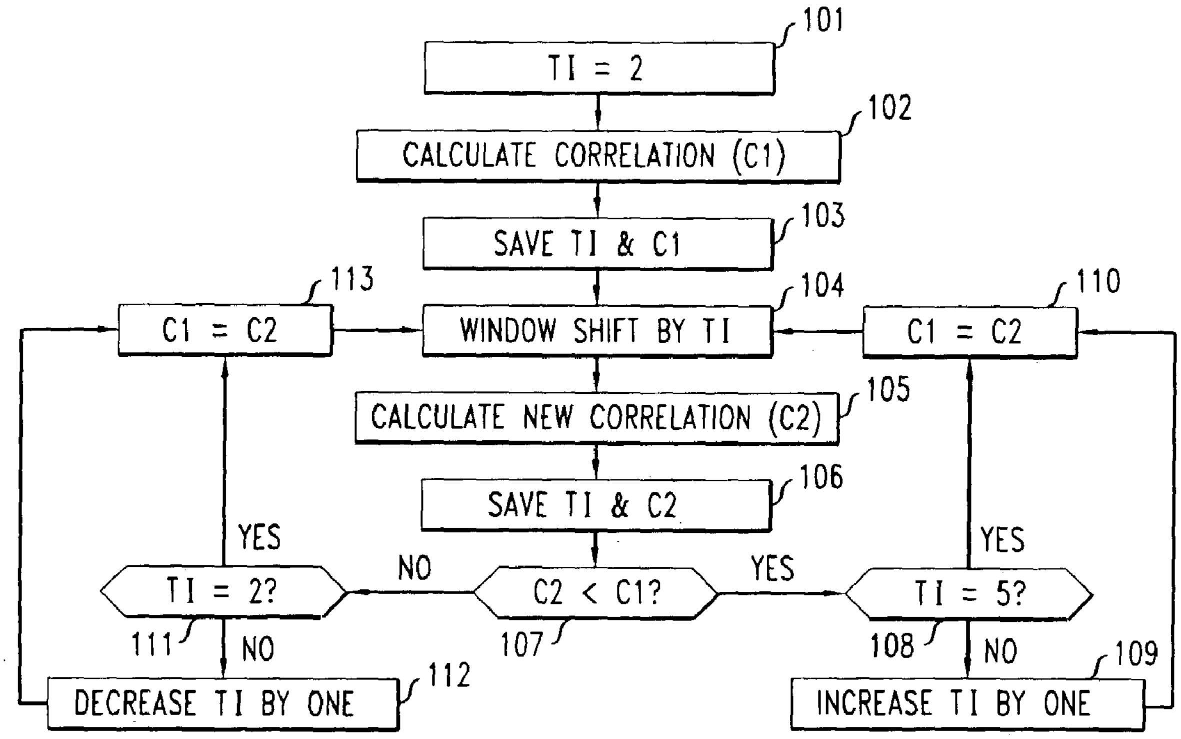
FIG. 1 shows a flowchart for dynamically adapting the tap interval used in calculating the normalized cross-correlation of previous speech data when speech frames have been lost in accordance with the illustrative embodiment of the present invention.

FIG. 1 shows a flowchart for dynamically adapting the tap interval used in calculating the normalized cross-correlation of previous speech data when speech frames have been lost in accordance with the illustrative embodiment of the present invention. In particular, the flowchart shows how an illustrative tap interval (TI), used in the calculation of a normalized cross-correlation for identifying a pitch period for use in lost speech frames, can be advantageously adapted to reduce the complexity of prior art methods such as, for example, G.711 PLC.

Specifically, referring to FIG. 1, block 101 sets the tap interval TI equal to 2, the initial (i.e., default) value. Block 102 then calculates correlation Cl and block 103 stores the values of the tap interval and the calculated correlation. Next, block 104 shifts the correlation window by the current tap interval, block 105 calculates a new correlation, C2, based on the shifted window, and block 106 stores the values of the tap interval and the new calculated correlation. Then, decision box 107 compares the two correlation values (C1 and C2), to determine whether the correlation is increasing or decreasing.

If it is determined by decision box 107 that the correlation is decreasing (i.e., if C2<C1), flow continues at decision box 108, which checks to see if the tap interval has reached its maximum limit (e.g., 5), and if not, to block 109 to increase the tap interval by one. Then, in either case, block 110 sets C1 equal to C2 and the process iterates at block 104 (where the window is once again shifted by the tap interval).

If, on the other hand, decision box 107 determines that the correlation is increasing (i.e., if C2≧C1), flow continues at decision box 111, which checks to see if the tap interval is at its minimum value (e.g., 2), and if not, to block 112 to decrease the tap interval by one. Then, in either case, block 113 sets C1 equal to C2 and the process iterates at block 104 (where the window is again shifted by the tap interval).

Pitch Estimation Avoidance in Accordance with the Illustrative Embodiment

Also in accordance with the illustrative embodiment of the present invention, a strategy complimentary to the adaptation of the tap interval is to advantageously bypass the pitch estimation altogether when it is deemed to be unnecessary. This is the case, for example, when the content of the saved pitch buffer may be identified as containing either silence or unvoiced speech. (As is fully familiar to one of ordinary skill in the art, voiced and unvoiced speech are the sounds associated with different speech phonemes comprising periodic and non-periodic signal characteristics, respectively.) In cases where the speech is unvoiced or silent, there is no need to perform pitch estimation, as simply padding zeros (for silence) or repeating previous unvoiced frames can produce a result with similar quality.

Therefore, in accordance with the illustrative embodiment of the present invention, a voice activity detector (VAD) and a phoneme classifier (e.g., a zero-crossing rate counter) are advantageously employed to distinguish between voice sounds, unvoiced sounds and silence, and to thereby initially determine the necessity of performing pitch estimation at all. In this manner, the relatively expensive cross-correlation process can be advantageously gated by a function having considerably lower complexity.

Figure 2:
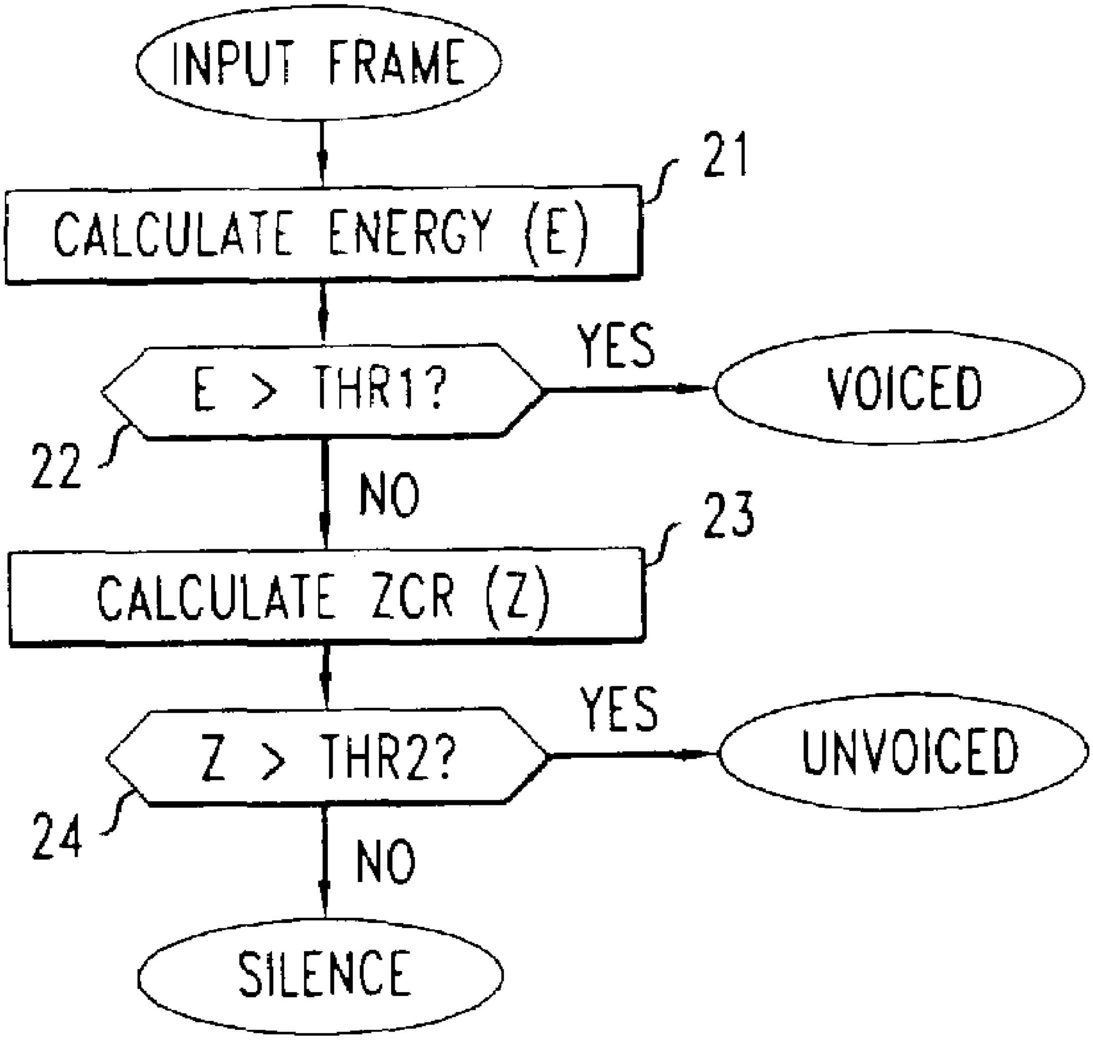
FIG. 2 shows a flowchart for enabling the advantageous bypassing of pitch estimation for unvoiced speech or silence in accordance with the illustrative embodiment of the present invention.

FIG. 2 shows a flowchart for enabling the advantageous bypassing of pitch estimation for unvoiced speech or silence in accordance with the illustrative embodiment of the present invention. Specifically, the flowchart shows how a previous (correctly received) speech frame may be classified into voiced speech, unvoiced speech, or silence.

First, the "Energy" of the previous frame is calculated in block 21. Specifically, the Energy, E, may be advantageously defined as:

$$E = \frac{\sum_{i=0}^{N-1} x(i)^2}{N},$$

where N is the number of samples in the frame and x(i) is the $i^{th}$ sample value. Then, the calculated energy E is compared to an energy threshold, THR1, as shown in decision box 22.

If the energy E exceeds the threshold, it can be advantageously assumed that the frame contains voiced speech, and the pitch estimation and associated cross-correlation should therefore be performed for purposes of packet loss concealment. Illustratively, THR1 may be approximately 10,000.

If, on the other hand, the energy E does not exceed the threshold, a "Zero Crossing Rate (ZCR) is calculated in block 23. Specifically, the zero-crossing rate, Z, may be advantageously defined as:

$$Z = \frac{\sum_{i=1}^{N-1} |sgn[x(i)] - sgn[x(i-1)]|}{N},$$

where, again, N is the number of samples in the frame and x(i) is the $i^{th}$ sample value, and where sgn[x(i)]=1 when x(i)≧0 and sgn[x(i)] =−1 when x(i)<0. Then, the zero-crossing rate Z is compared to a crossing rate threshold, THR2, as shown in decision box 24.

If the zero-crossing rate Z exceeds the threshold, it can be advantageously assumed that the frame contains unvoiced speech. Therefore, the pitch estimation and associated cross-correlation need not be performed, and packet loss concealment may be achieved, for example, by merely repeating previous unvoiced frames.

If, on the other hand, the zero-crossing rate Z does not exceed the threshold, it can be advantageously assumed that the frame contains silence. Therefore, the pitch estimation and associated cross-correlation again need not be performed, and packet loss concealment may, for example, be achieved by merely padding zeros. Illustratively, THR2 may be approximately 100.

Algorithmic Delay Elimination According To The Illustrative Embodiment

Also in accordance with the illustrative embodiment of the present invention, the algorithmic frame delay incurred with the use of G.711 PLC may be advantageously eliminated. In particular, G.711 PLC delays each frame by 3.75 ms for the overlap-add operation which is required when packet loss concealment is performed. This delay, however, can be quite disadvantageous in voice-over-IP applications, where reducing the total end-to-end transmission delay is critical. Moreover, such a delay is disadvantageous in that it requires 30 bytes of storage memory per channel. In accordance with the illustrative embodiment of the present invention, a waveform “bending” operation is performed into the current frame, without any added frame delay. (Advantageously, the approach of the illustrative embodiment also slightly decreases the overall complexity, requires only one byte of storage memory per channel, and does not appear to have a negative effect on quality.)

FIG. 3 shows the steps of an illustrative waveform “bending” operation being performed into the current frame without inserting delay in accordance with the illustrative embodiment of the present invention. In particular, FIG. 3A shows the loss of a speech segment following a received packet. FIG. 3B then shows the duplication of previous speech into the lost speech segment, thereby generating an initial speech waveform for the lost material. Specifically, the last pitch period of the previous (properly received) frame is identified, and that portion of the previous frame is duplicated (as many times as necessary) in an attempt to conceal the lost packet.

Figure 3A:
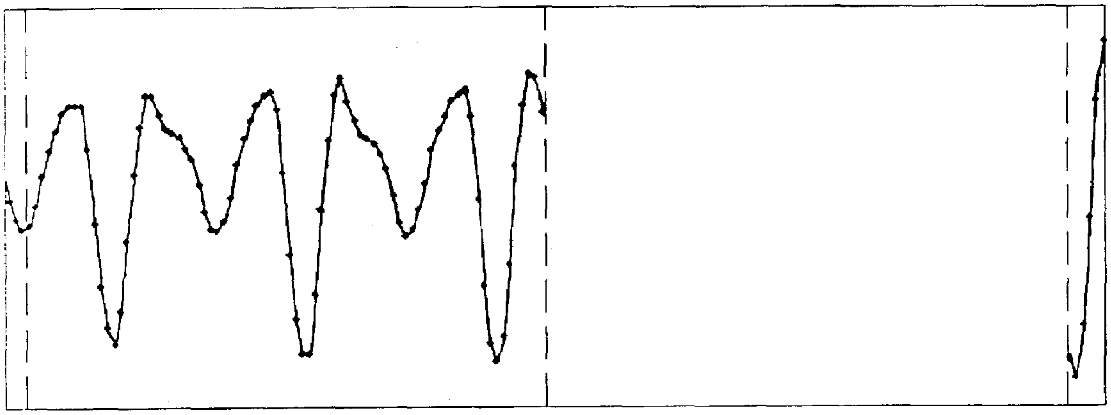
FIG. 3A shows the loss of a speech segment.
Figure 3B:
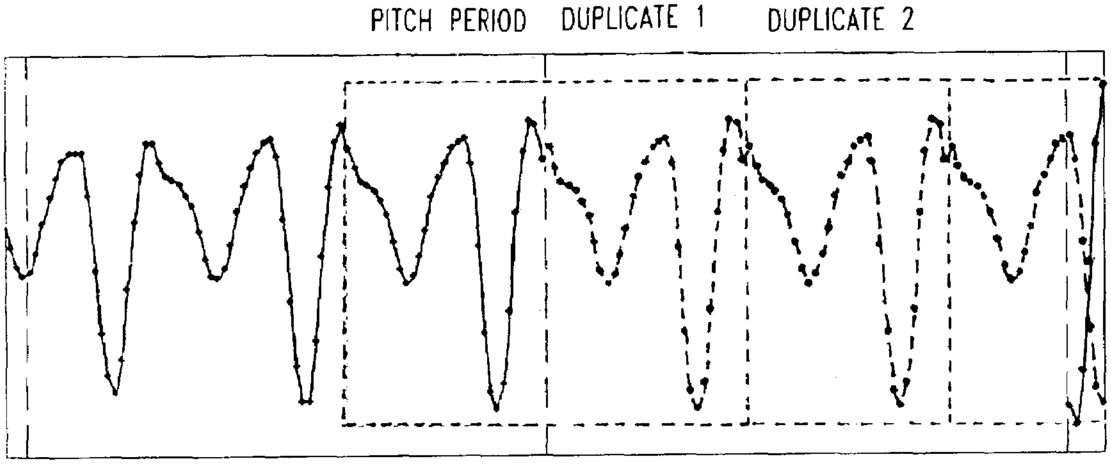
FIG. 3B shows the duplication of previous speech into the lost speech segment.
Figure 3C:
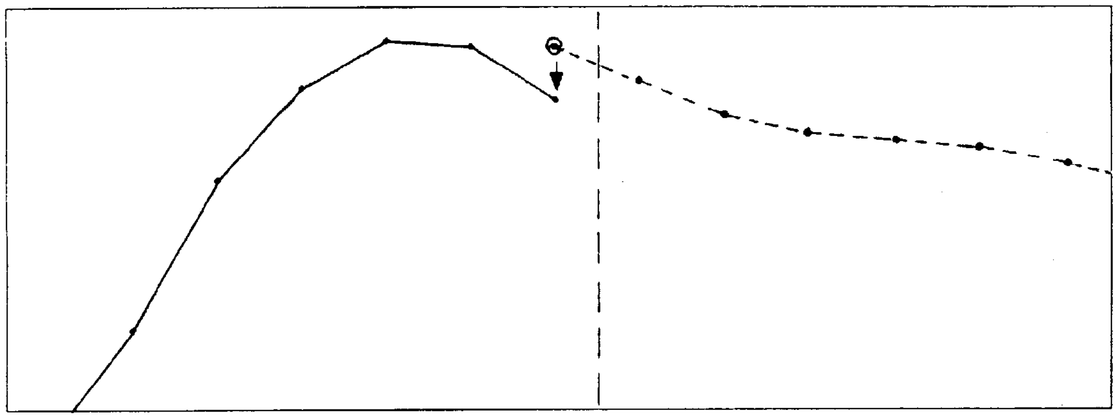
FIG. 3C shows the boundary formed between found and generated speech.

FIG. 3C, however, shows a close-up view of the boundary formed between the received speech and the initially generated speech. In particular, due to possible misalignment between the received and generated material, the last found sample and first generated sample will not, in general, be aligned in terms of amplitude. Such an amplitude discontinuity as shown will result in substantial distortions in the frequency domain, and therefore in the speech quality. Note that the encircled dot in FIG. 3C shows a sample preceding the generated speech. (Note also that the generated speech is simply a “clip” of the previous material. The circled dot in the figure shows the sample immediately preceding this clip. Illustratively, in this case, the identified pitch period was the previous 31 samples, and therefore the encircled dot is 32 samples back.)

Figure 3D:
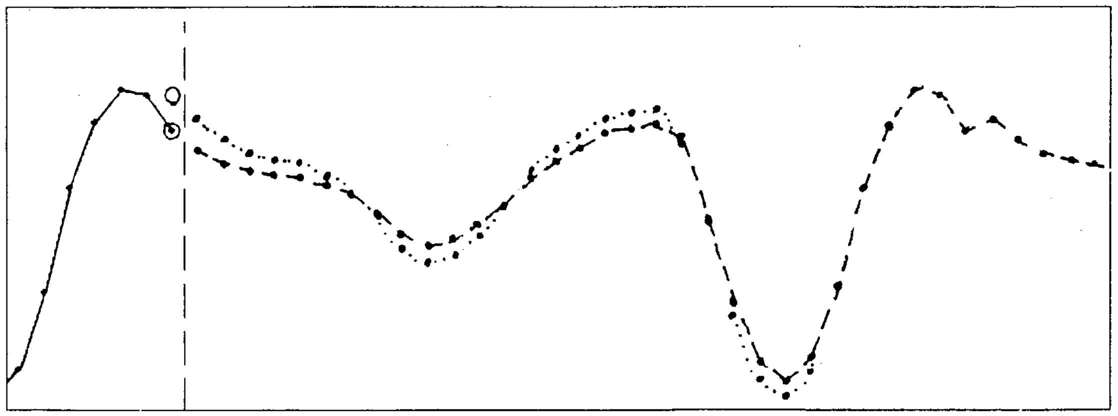
FIG. 3D shows the "bending" of the generated speech to align the segments.

Ideally, the encircled dot in FIG. 3C should have the same amplitude as the last received sample shown below it. Thus, in accordance with the illustrative embodiment of the present invention, the generated speech waveform is modified so as to force an alignment of these sample points. Specifically, FIG. 3D shows the “bending” of the generated speech to align the segments in accordance with the illustrative embodiment.

More particularly, an initial multiplication factor, M, is advantageously chosen such that multiplying the value of the circled sample point shown in FIG. 3C by M yields the desired, last received sample. Moreover, and as can be seen in FIG. 3D, each sample for the first 3.75 ms of generated speech is advantageously multiplied by a factor which, while initially equal to M, gradually reduces to 1 (or gradually increases to 1, if M is initially less than 1). That is, a ramp weight is applied to the factor M such that it is slowly changes from its initial value to a value of 1. In other words, the effect of the multiplicative factor M is faded out over the time interval until the samples are generated unmodified. (For example, if M were to start out at 1.10, it would slowly be tuned down to 1.09, 1.08, 1.07, . . . , 1.0.) Since multiplying by 1 has no effect on a sample, this gradual fading essentially ends the weighting at the end of the time interval (e.g., 3.75 ms).

As can be clearly seen from the figure, this technique is analogous to “bending” the first 3.75 ms of generated speech into the correct position. That is, the generated speech is “bent” so as to align the encircled dot where it should ideally be. The other samples on the line are also bent, but increasingly less so. Then, after 3.75 ms of generated speech, the waveform is no longer bent at all—that is, the samples are no longer modified.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

We claim:

1. A method for performing packet loss concealment in a packet-based speech communication system, the method comprising the steps of:

receiving one or more speech packets comprising speech data, the speech data comprising a sequence of speech data samples;

identifying the loss of a speech packet comprising speech data subsequent to the speech data comprised in said one or more received speech packets;

determining a pitch period of said speech data comprised in said one or more received speech packets by performing a plurality of cross-correlation operations on said received speech data samples, each of said cross-correlation operations being performed on a subset of said received speech data samples comprising less than all of said speech data samples, each of said subsets of speech data samples being selected from said all of said speech data samples with use of a tap interval;

adjusting said tap interval based on a difference between a first one of said cross-correlation operations and a second one of said cross-correlation operations; and generating speech data for said lost speech packet based on said speech data samples comprised in said one or more received speech packets, and further based on said determined pitch period.

2. The method of claim 1 wherein the step of adjusting the tap interval comprises increasing the value of the tap interval when the first one of said cross-correlation operations results in a higher correlation value than the second one of said cross-correlation operations, and decreasing the value of the tap interval when the first one of said cross-correlation operations results in a lower correlation value than the second one of said cross-correlation operations.

3. The method of claim 2 wherein the step of adjusting the tap interval further comprises comparing the tap interval to an upper limit prior to said increasing of said value thereof, and comparing the tap interval to a lower limit prior to said decreasing of said value thereof.

4. The method of claim 1 further comprising the step of analyzing said one or more received speech packets to determine whether the speech data comprised therein represents voiced speech, and performing the step of determining the pitch period of said speech data comprised in said one or more received speech packets when said speech data is determined to represent voiced speech.

5. The method of claim 4 wherein the step of generating said speech data for said lost speech packet comprises repeating one of said received speech packets when said speech data is determined not to represent voiced speech.

6. The method of claim 4 wherein said step of analyzing said one or more received speech packets to determine whether the speech data comprised therein represents voiced speech comprises calculating an energy level of said one or more received speech packets and comparing said calculated energy level to a predetermined threshold.

7. The method of claim 4 further comprising the step of analyzing said one or more received speech packets to determine whether the speech data comprised therein represents silence, and performing the step of determining the pitch period of said speech data comprised in said one or more received speech packets when said speech data is also determined not to represent silence.

8. The method of claim 7 wherein the step of generating said speech data for said lost speech packet comprises padding said received speech packets with zero data when said speech data is determined to represent silence.

9. The method of claim 7 wherein said step of analyzing said one or more received speech packets to determine whether the speech data comprised therein represents silence comprises calculating a zero-crossing rate for said one or more received speech packets and comparing said calculated zero-crossing rate to a predetermined threshold.

10. The method of claim 1 wherein said step of generating said speech data for said lost speech packet comprises repeating a portion of said one or more received speech packets, said portion of said one or more received speech packets having a length equal to said determined pitch period.

11. The method of claim 10 wherein said step of generating said speech data for said lost speech packet further comprises the step of modifying said repeated portion of said one or more received speech packets such that said speech data comprised in a last one of said one or more received speech packets and said speech data generated for said lost speech packet align to form a continuous waveform at a boundary therebetween.

12. The method of claim 11 wherein said step of modifying said repeated portion of said one or more received speech packets comprises the steps of:

calculating an initial multiplicative factor by which a first speech sample comprised in said generated speech data is multiplied, thereby resulting in said alignment of said speech data comprised in said last one of said one or more received speech packets and said speech data generated for said lost speech packet; and multiplying each successive speech sample comprised in an initial portion of said generated speech data by an associated multiplicative factor, the multiplicative factors associated with each successive speech sample gradually changing from said initial multiplicative factor at said first speech sample to unity at a last speech sample comprised in said initial portion of said generated speech data.

13. An apparatus for performing packet loss concealment in a packet-based speech communication system, the apparatus comprising a processor adapted to:

receive one or more speech packets comprising speech data, the speech data comprising a sequence of speech data samples;

identify the loss of a speech packet comprising speech data subsequent to the speech data comprised in said one or more received speech packets;

determine a pitch period of said speech data comprised in said one or more received speech packets by performing a plurality of cross-correlation operations on said received speech data samples, each of said cross-correlation operations being performed on a subset of said received speech data samples comprising less than all of said speech data samples, each of said subsets of speech data samples being selected from said all of said speech data samples with use of a tap interval;

adjust said tap interval based on a difference between a first one of said cross-correlation operations and a second one of said cross-correlation operations; and generate speech data for said lost speech packet based on said speech data samples comprised in said one or more received speech packets, and further based on said determined pitch period.

14. The apparatus of claim 13 wherein adjusting the tap interval comprises increasing the value of the tap interval when the first one of said cross-correlation operations results in a higher correlation value than the second one of said cross-correlation operations, and decreasing the value of the tap interval when the first one of said cross-correlation operations results in a lower correlation value than the second one of said cross-correlation operations.

15. The apparatus of claim 14 wherein adjusting the tap interval further comprises comparing the tap interval to an upper limit prior to said increasing of said value thereof, and comparing the tap interval to a lower limit prior to said decreasing of said value thereof.

16. The apparatus of claim 13 wherein the processor is further adapted to analyze said one or more received speech packets to determine whether the speech data comprised therein represents voiced speech, and to determine the pitch period of said speech data comprised in said one or more received speech packets when said speech data is determined to represent voiced speech.

17. The apparatus of claim 16 wherein generating said speech data for said lost speech packet comprises repeating one of said received speech packets when said speech data is determined not to represent voiced speech.

18. The apparatus of claim 16 wherein analyzing said one or more received speech packets to determine whether the speech data comprised therein represents voiced speech comprises calculating an energy level of said one or more received speech packets and comparing said calculated energy level to a predetermined threshold.

19. The apparatus of claim 16 wherein the processor is further adapted to analyze said one or more received speech packets to determine whether the speech data comprised therein represents silence, and to determine the pitch period of said speech data comprised in said one or more received speech packets when said speech data is also determined not to represent silence.

20. The apparatus of claim 19 wherein generating said speech data for said lost speech packet comprises padding said received speech packets with zero data when said speech data is determined to represent silence.

21. The apparatus of claim 19 wherein analyzing said one or more received speech packets to determine whether the speech data comprised therein represents silence comprises calculating a zero-crossing rate for said one or more received speech packets and comparing said calculated zero-crossing rate to a predetermined threshold.

22. The apparatus of claim 13 wherein generating said speech data for said lost speech packet comprises repeating a portion of said one or more received speech packets, said portion of said one or more received speech packets having a length equal to said determined pitch period.

23. The apparatus of claim 22 wherein generating said speech data for said lost speech packet further comprises modifying said repeated portion of said one or more received speech packets such that said speech data comprised in a last one of said one or more received speech packets and said speech data generated for said lost speech packet align to form a continuous waveform at a boundary therebetween.

24. The apparatus of claim 23 wherein modifying said repeated portion of said one or more received speech packets comprises:

calculating an initial multiplicative factor by which a first speech sample comprised in said generated speech data is multiplied, thereby resulting in said alignment of said speech data comprised in said last one of said one or more received speech packets and said speech data generated for said lost speech packet; and multiplying each successive speech sample comprised in an initial portion of said generated speech data by an associated multiplicative factor, the multiplicative factors associated with each successive speech sample gradually changing from said initial multiplicative factor at said first speech sample to unity at a last speech sample comprised in said initial portion of said generated speech data.

* * * * *